3,549,582
EPOXY RESIN POWDERS OF ENHANCED SHELF STABILITY WITH A TRIMELLITIC ANHYDRIDE DIMER AS CURING AGENT
William L. Payne, Wakefield, R.I., and Charles A. Fetscher, Olean, N.Y., assignors to The Dexter Corporation, Olean, N.Y., a corporation of Connecticut
No Drawing. Filed Oct. 11, 1967, Ser. No. 674,658
Int. Cl. C08g 30/12
U.S. Cl. 260—37         6 Claims

ABSTRACT OF THE DISCLOSURE

In epoxy resin powders the desirable heat curing characteristics of trimellitic anhydride can be effectively utilized while avoiding the problem of very limited storage stability of systems containing trimellitic anhydride by employing a dehydrated derivative, hereinafter referred to as TMA dimer, in which two molecules of trimellitic anhydride are condensed with the formation of an intermolecular anhydride group. The pure dimer contains no free acid groups, but it is difficult and unnecessary to remove all traces of residual acidity; and epoxy resin systems containing the TMA dimer show markedly enhanced storage stability if the acid content has been reduced by at least 80% when forming the dimer. The TMA dimer is employed in the proportion of about 0.55 to 0.90, and preferably about 0.55 to 0.65, anhydride equivalents per epoxide

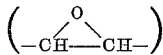

equivalent of resin, and on a weight basis is utilized much more effectively than the free trimellitic anhydride.

BACKGROUND OF THE INVENTION

It is known that carboxylic acids and carboxylic acid anhydrides react with, and cure, epoxy resin systems, particularly those containing the characteristic

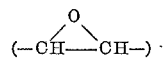

epoxide groups. Trimellitic anhydride, the 1,2 anhydride of 1,2,4 benzene tricarboxylic acid, which contains both a free acid and an anhydride group is a useful epoxy curing agent. It has a molecular weight of 192, and since both the anhydride and the free acid groups enter into epoxide polymerizations it is generally considered as having a functionality of 2 and equivalent weight of 96.

Epoxy resin systems containing trimellitic anhydride cure adequately when heated and are perfectly satisfactory systems when they are to be used immediately after, or shortly after, mixing. Trimellitic anhydride containing epoxy resin systems unfortunately have very limited storage stability, and powder systems containing trimellitic anhydride will generally pre-cure, or partially cure and become useless after from 1 to 10 days at room temperature. Thus the advantages of trimellitic anhydride as a curing agent for epoxy resin systems have heretofore been utilized only in multi-component systems which must be mixed just prior to use. In powder systems this becomes highly impractical, and there is, therefore, a basic need for a hardening agent having the polymer forming characteristics of trimellitic anhydride, but with a stability to permit practical storage of pre-mixed powder compositions.

THE INVENTION

It has been discovered, in accordance with the present invention, that powdered epoxy resin systems can be prepared which have indefinite storage stability at room temperature and which cure rapidly at temperatures of the order of 300 to 400° F. by employing as hardener in such systems a trimellitic anhydride dimer (TMA dimer) in which two moles of trimellitic anhydride are condensed or dehydrated with conversion of the free acid groups to a connecting, intermolecular anhydride group. The TMA dimer has a molecular weight of 366, and being tri-functional has an equivalent weight of 122. The anhydride groups, however, tend to react first with alcohol groups of the resin to form acid esters, and the free acid groups then react with epoxide

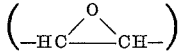

groups, with both reactions contributing to the cross-linking and polymerization of the resin. Thus in practice the TMA dimer can be used in the proportion of about 0.55 to 0.9, and preferably about 0.55 to 0.65, anhydride equivalents to each epoxide equivalent of resin.

The TMA dimer is not a new compound, and it can be prepared by various known methods for dehydrating carboxylic acids to anhydrides. A practical method is to heat equimolecular amounts of trimellitic anhydride and acetic anhydride at reflux for about one-half hour and then distill off the acetic acid which is formed, adding an amount of acetic anhydride (equivalent to the distilled acid) and again heating and distilling off acid, and repeating this sequence of steps with a final vacuum distillation to remove traces of acetic acid. It is possible in this way to obtain about 100% conversion of the trimellitic anhydride to TMA dimer, with no detectable free acid groups remaining in the dimer, but in practice it is not necessary to effect such complete conversion. The dehydration should be continued, however, until at least 80%, and preferably at least 90% of the acid groups of the trimellitic anhydride have been converted to anhydride groups, since a lesser degree of dehydration will impair the stability of epoxy resin compositions containing the dimer. The 80% conversion to anhydride provides in the TMA dimer an acid equivalent weight of about 900, with this amount approaching an infinitely high value as the conversion to anhydride approaches 100%. Thus the TMA dimers suitable for use in the new stable epoxy resin compositions are those having an acid equivalent weight in excess of about 900, and particularly those in which there has been 80 to 90% conversion of the free acid to anhydride.

The enhanced stability at room temperature and good reactivity at curing temperature in the 300–400° F. range when using the TMA dimer as a hardening agent applies to powdered epoxy systems generally wherein the resins provide reactive epoxide

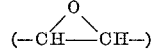

groups. Furthermore, such systems can contain fillers and coloring agents in amounts as high as about 70% by weight of the total composition, with such amount preferably being held below about 30% when flexibility in the cured resin is desired.

It is also within the scope of the invention to employ additional anhydride hardening agents and/or polymerization catalysts to increase the rate of cure. Typical examples of such variations are shown in the illustrative examples, and in each instance it will be apparent that the TMA dimer (with an acid equivalent weight in excess of 900) provides results distinctly superior to trimellitic anhydride.

Powdered compositions employing TMA dimer are particularly adapted for use in the coating of heated objects by fluidized bed and dry spray techniques. They can also be employed as molding powders, although the curing time is a bit slow for normal molding operations when using the TMA dimer as the only hardener. Cure characteristics of molding powders can be adjusted, however, by appropriate addition of a tertiary amine catalyst or activator for the polymerization. Also, in molding powders it is important to include conventional mold release agents in order to facilitate separation of molded articles from the dies or molds.

The new powdered compositions can comprise a uniform blend of separate particles of the resin, hardener, filler, and other components. Preferably, however, such a unform blend is fused or fluxed to solid form and reground to a powder of appropriate particle size for coating or for molding, with individual particles of the resulting powder each containing a mixture of the several components. Such fluxing can be accomplished by feeding the powder blend to a two-roll mill having one roll heated to about 120–160° F., working the mass for a limited time, such as 2 to 6 minutes until uniformity is obtained in the plastic mass, then removing and cooling sheets of this plastic mass, and breaking and grinding the hardened sheets to the desired particle size. For coating powders this particle size is generally about 80 to 325 mesh, or 177 to 44 microns.

The following examples show how the TMA dimer can be prepared and utilized in various powdered epoxy resin systems, and include comparative data for the dimer and trimellitic anhydride, but it is to be understood that these examples are given by way of illustration and not of limitation.

Example I

*Preparation of TMA dimer.*—In a suitable flask equipped with stirrer reaching into the batch, and a short still head, 382 g. of trimellitic anhydride (2 moles) and 204 g. acetic anhydride (2 moles) were heated at gentle reflux for one-half hour at a pot temperature of 163° C. The mixture was then allowed to distill slowly at an initial pot temperature of 120° C. and continued until the pot temperature was 175° C., 91.2 g. of distillate being collected. 91.2 g. of additional acetic anhydride was added to the batch and distillation was resumed at an initial pot temperature of 165° C. and continued until the pot temperature reached 175° C. The 30 g. collected distillate was replaced with 30 g. of acetic anhydride and distillation was again resumed and continued until the pot temperature reached 175° C. This sequence of steps was repeated until a total of 200.9 g. of distillate was recovered, each fraction of distillate being analyzed for acetic acid, and the total contained acid was found to be 112.4 g. or 93.67% of the 120 g. expected.

Then with the pot temperature at 175° C. the pressure was slowly reduced to 40 mm. to remove remaining acetic acid and acetic anhydride. After about 45 minutes the mass solidified and the temperature rose spontaneously to 190° C. The heat was then removed and drying continued at full vacuum for 90 minutes.

The product was removed from the flask and ground to a light buff powder having a melting point of 212–216° C. which compares favorably with a melting point of 210° C. for the pure dimer. The product was analyzed for anhydride and acid equivalent weight and found to have no acidity, and an anhydride equivalent weight of 119.0 which compares favorably with the theoretical value of 122. This material, which is essentially pure TMA dimer, is referred to in the following examples as Dimer A.

By procedures generally similar to those described above, but involving fewer distillation fractions two incompletely dehydrated dimers were prepared with the following characteristics:

Dimer B showing an acid equivalent weight of 625, corresponding with about 70% conversion of the original acid groups of the trimellitic anhydride to the connecting anhydride group of the dimer.

Dimer C having an acid equivalent weight of about 900, corresponding with about 80% conversion of acid groups to anhydride groups.

Finely ground samples of Dimer A above described and trimellitic anhydride were exposed for a period of 6 days to concurrent (but uncontrolled) identical, conditions in which the humidity ranged from 35 to 90% R.H. and the temperature ranged from 50 to 85° F., the acid equivalent weight and anhydride equivalent weight for the two samples were determined before and after exposure and these values together with the theoretical values for the dimer, trimellitic anhydride, and trimellitic acid are tabulated below:

EQUIVALENT WEIGHT

|  | Free acid | Anhydride |
|---|---|---|
| TMA dimer: |  |  |
| Theory | (¹) | 122.0 |
| At start | (¹) | 120.41 |
| After exposure | 789.17 | 133.71 |
| Trimellitic anhydride: |  |  |
| Theory | 192 | 192 |
| At start | 184.66 | 196.18 |
| After exposure | 72.08 | 3745.3 |
| Trimellitic acid: |  |  |
| Theory | 70 | (¹) |

¹ Infinite.

The foregoing tabulation indicates the marked difference in stability between trimellitic anhydride and the TMA dimer, and it is evident that with more extended exposure to atmospheric conditions trimellitic acid would be completely converted to trimellitic acid. It is this difference in stability of the two anhydrides that is believed to be responsible for the difference in stability of epoxy resins containing trimellitic anhydride and those containing the TMA dimer. It appears that in association with epoxy resin the presence of the free acid group in trimellitic anhydride tends to catalyze the reaction between anhydride groups and free hydroxyl groups of the resin to form an ester linkage and an additional free acid group. Such newly formed or nascent acid groups react readily with epoxide groups of the resin, and failing to react with epoxide groups, they tend to increase the acidity of the system and the catalytic activity above mentioned. With the TMA dimer, in which at least 80% of the acid groups have been converted to intermolecular anhydride groups, the acid concentration is apparently reduced to a sufficiently low level to prevent initiation and acceleration of the catalytic action which characterizes free trimellitic anhydride.

In the following examples which illustrate the very considerable difference in the behavior of epoxy resin systems containing trimellitic anhydride on the one hand, and more or less completely dehydrated TMA dimer on the other hand, the resins employed are identified as follows: Resin A is a bisphenol A epoxy resin of epoxy equivalent weight 900 and a Durran's softening point of about 100° C. Resin B is a bisphenol A epoxy resin of epoxy equivalent weight 1,000 and a Durran's softening point of about 130° C. Resin C is a bisphenol A epoxy resin of epoxy equivalent weight 600 and a Durran's softening point of about 80° C.

Example II

Three similar powder formulations were prepared containing the resin, filler, and different hardener components as indicated in the following tabulation. The resin and hardener components were ground to about 80 to 100 mesh and pigments and other additives were very finely ground (about 95% through a 325 mesh sieve) and the powdered components were dry blended to a homogeneous mixture. The material was then fluxed on a two-roll mill, with the front roll at 120–160° F. and the back roll cold, for 2 to 6 minutes. Sheets were then taken of, cooled, and ground to a particle size of about 80–325 mesh.

| Component | IIA, parts | IIB, parts | IIC, parts |
|---|---|---|---|
| Resin A | 43.3 | 43.6 | 43.6 |
| Zn acetate | 0.2 | 0.2 | 0.2 |
| Powdered silica | 44.3 | 44.3 | 44.3 |
| Red iron oxide | 0.5 | 0.5 | 0.5 |
| TMA | 7.4 |  |  |
| Dimer A |  | 5.6 |  |
| Dimer B |  |  | 5.6 |

The several powders were aged for different periods at 100° F. and tested for coating characteristics from time to time by the following procedure. A quantity of each powder was fluidized using an Armstrong Laboratory Fluidizer model A, and a clean hardened steel bar preheated to 400° F. was dipped into the fluidized powder and held there from 3 to 5 seconds and then removed and cured in an oven at 400° F. for 5 minutes. The coating was then evaluated on the following basis. A good powder gives a smooth solid continuous coating which is glossy unless deliberately flattened. An unstable powder which is partially pre-cured on aging gives a coating which is grainy, porous, and full of pin holes. The differences are extreme and obvious.

Powder IIA gave a grainy, porous coating after three days aging at 100° F.

Powder IIC was stable and useful for about a week at 100° F. Not very much better than Powder IIA with unmodified TMA. It is apparent that dehydration to this extent is not sufficient to make an important improvement in stability.

Powder IIB was perfectly operable and gave good coatings after three months aging at 100° F. The method of application gave a coating of about 15 mil in thickness. At 400° F. the molten powder gelled in 15 to 20 seconds, and the cured coating after 3 minutes at 400° F. passed a 160 inch pound direct impact test. It had a good glossy appearance and showed strong adhesion to the bar.

Example III

Following the procedures of Example II powdered epoxy resin formulation was prepared having the compositions indicated in the following tabulation and were tested for coating characteristics after aging at 100° F. with the results indicated below.

| Component | IIIA, parts | IIIB, parts |
|---|---|---|
| Resin B | 53.50 | 53.00 |
| Resin C | 21.00 | 20.00 |
| Zinc acetate | 0.30 | 0.30 |
| Amorphous silica | 18.10 | 16.30 |
| Brown iron oxide | 1.00 | 1.00 |
| Dimer A | 6.10 | |
| TMA | | 9.40 |

Powder IIIA was still perfectly useful and gave good smooth continuous coatings after two months at 100° F.

Powder IIIB gave a grainy, rough coating after 10 days of storage at 100° F.

Example IV

Following the procedure of Example II, three similar powder formulations were prepared containing the resin, filler, and different hardener components as indicated in the following tabulation, and were tested for coating characteristics after aging at 100° F. with the results indicated below.

| Component | IVA, parts | IVB, parts | IVC, parts |
|---|---|---|---|
| Resin B | 75.00 | 75.00 | 74.00 |
| Trimethylamine SO₃ complex | 0.30 | 0.30 | 0.30 |
| Amorphous silica | 17.60 | 17.60 | 16.20 |
| Brown iron oxide | 1.00 | 1.00 | 1.00 |
| Dimer A | 6.10 | | |
| Dimer C | | 6.10 | |
| TMA | | | 8.50 |

Powder IVA gave a perfectly smooth and satisfactory coating after 23 days of storage at 100° F.

Powder IVB was perfectly stable for 23 days at 100° F. The coating obtained at the end of 23 days storage was entirely equivalent to that realized with Powder IVA.

Powder IVC gave a grainy coating after seven days at 100° F.

Example V

Following the procedure of Example II, two similar powder formulations were prepared containing the resin, filler, and different hardener components as indicated in the following tabulation, and were tested for coating characteristics after aging at 100° F. with the results indicated below.

| Component | VA, parts | VB, parts |
|---|---|---|
| Resin A | 45.00 | 45.00 |
| Zinc acetate | 1.00 | 1.00 |
| Amorphous silica | 45.25 | 44.95 |
| Red iron oxide | 0.5 | 0.5 |
| Aluminum silicate | 4.00 | 4.00 |
| Cyclopentane dianhydride | 2.75 | 2.75 |
| Dimer A | 1.40 | |
| TMA | | 1.80 |

Powder VA gave a perfectly fused, smooth coating after 28 days storage. At the end of 35 days at 100° F. the coating formed was beginning to show slight graininess.

Powder VB gave an unsatisfactory grainy coating after four days at 100° F. This shows that TMA even when present as a very small percentage of the total powder and as only part of the hardener portion still makes the system quite unstable.

The foregoing examples indicate not only the substantial improvement in stability and coating characteristics with the TMA dimer, but also the substantial economy or saving on a weight basis, when employing the TMA dimer. Thus, although two functional groups (the free acid groups) of two moles of trimellitic anhydride are converted to an anhydride group in the resulting one mole of TMA dimer with an apparent lowering of the functionality of the dimer, practical experience demonstrates that there is a more efficient polymerization of epoxy resin by the TMA dimer.

Various changes and modifications are in the powdered resin compositions containing TMA dimer as a hardener as herein disclosed will occur to those skilled in the art, and to the extent that such changes and modifications are embraced by the appended claims, it is to be understood that they constitute part of the present invention.

We claim:

1. In a powdered, epoxy resin, heat curable composition adapted for use in coatings and moldings and comprising powdered epoxy resins having characteristic epoxide

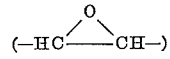

groups and an anhydride type hardener, the improvement comprising employing as the hardener for said resin a TMA dimer consisting of dehydrated trimellitic anhydride in which at least about 80% of the free acid groups of said trimellitic anhydride have been converted to intermolecular anhydride groups, said TMA dimer being in solid powdered form and present in said composition in the proportion of from about 0.55–0.90 anhydride equivalent per epoxide

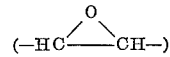

equivalent of resin, said powdered composition being characterized in that it cures rapidly at temperatures of the order of about 300–400° F. and is stable for many months at room temperature.

2. A powdered epoxy resin composition as defined in claim 1 wherein the TMA dimer is dehydrated to the extent of converting 80 to 90% of said free acid groups to intermolecular anhydride groups.

3. A powdered epoxy resin composition as defined in claim 1 wherein individual particles of said powder consist of a homogeneous blend of the several components of said composition.

4. A powdered epoxy resin composition as defined in claim 3 which includes filler and coloring agent, in amounts not exceeding about 70% by weight of the overall composition.

5. A powdered epoxy resin composition as defined in claim 1 in the form of a coating powder wherein the powder particles are of appropriate size for application to heated substrates by fluidized bed and dry spray techniques.

6. A powdered epoxy resin composition as defined in claim 1 wherein the powder particles are of a size adapting said composition to molding application.

References Cited

UNITED STATES PATENTS

| | | | |
|---|---|---|---|
| 3,098,059 | 7/1963 | Van Strien et al. | 260—78.5 |
| 3,183,248 | 5/1965 | Hirsch et al. | 260—346.3 |
| 3,294,865 | 12/1966 | Price | 260—837 |
| 3,374,193 | 3/1968 | Tsatsos et al. | 260—18 |
| 3,388,185 | 6/1968 | Goldberg et al. | 260—830 |
| 3,400,098 | 9/1968 | Parry | 260—37 |
| 3,435,002 | 3/1969 | Holub | 260—46.5 |

OTHER REFERENCES

Epoxy Resins, Skeist et al.: 1958, pp. 45–48, 90–95 and 247.

Handbook of Epoxy Resins, March 1967, Lee et al.: pp. 5–20 to 5–24, 12–22 to 12–23, 12–39, 14–2, 14–9, 14–12, 20–14 to 20–17, 20–21 and 17–43.

WILLIAM H. SHORT, Primary Examiner

H. SCHAIN, Assistant Examiner

U.S. Cl. X.R.

117—128.4, 132, 161; 260—47